United States Patent [19]
Minami

[11] Patent Number: 5,236,221
[45] Date of Patent: Aug. 17, 1993

[54] RESTRAINING PROTECTIVE SEAT FOR INFANTS

[75] Inventor: Yoshihiko Minami, Shiga, Japan

[73] Assignee: Takata Corporaton, Tokyo, Japan

[21] Appl. No.: 651,373

[22] PCT Filed: Jun. 28, 1990

[86] PCT No.: PCT/JP90/00840
§ 371 Date: Feb. 26, 1991
§ 102(e) Date: Feb. 26, 1991

[87] PCT Pub. No.: WO91/00201
PCT Pub. Date: Jan. 10, 1991

[30] Foreign Application Priority Data
Jun. 30, 1989 [JP] Japan .................. 1-168712

[51] Int. Cl.⁵ .............................. B60R 22/36
[52] U.S. Cl. .................. 280/806; 297/256.13
[58] Field of Search .......... 280/801, 806, 748; 297/250, 482

[56] References Cited

U.S. PATENT DOCUMENTS

| | | | |
|---|---|---|---|
| 3,455,603 | 7/1969 | Nicholas | 297/482 |
| 4,348,048 | 9/1982 | Thevenot | 297/250 |
| 4,678,205 | 7/1987 | Wold | 297/482 |
| 4,709,960 | 12/1987 | Launes | 297/250 |
| 4,743,064 | 5/1988 | Takizawa | 297/250 |
| 4,923,214 | 5/1990 | Siegrist et al. | 280/806 |
| 5,061,012 | 10/1991 | Parker et al. | 297/250 |

FOREIGN PATENT DOCUMENTS 235137 9/1988 Japan .

Primary Examiner—Kenneth R. Rice
Attorney, Agent, or Firm—Nikaido, Marmelstein, Murray & Oram

[57] ABSTRACT

A protecting member (10), which does not allow a seat belt (7) to come into direct contact with a seat main unit (2) when the seat belt (7) is tightened, is interposed between the seat belt (7) and the seat main unit (2). An engaging mechanism (2c, 10d, 11, 12), which causes the protecting member (10) and the seat main unit (2) to engage when the vehicle undergoes deceleration in excess of a predetermined value, is provided. As a result, the seat belt (7) does not directly engage the seat main unit (2) when an infant restraining protective seat (1) is secured to a vehicle seat by pulling the seat belt (7) tightly upon passing it through mounting holes in the seat main unit (2). Accordingly, the reclining angle of the seat main unit (2) can be adjusted with the seat belt left (7) in the tightened state. Since the protecting member (10) and the seat main unit (2) are engaged by the engaging mechanism (2c, 10d, 11, 12) when the vehicle undergoes a large amount of deceleration, the seat main unit (2) can be held reliably without undergoing a change in reclined attitude.

8 Claims, 8 Drawing Sheets

RESTRAINING PROTECTIVE SEAT FOR INFANTS

TECHNICAL FIELD

This invention relates to a restraining protective seat for infants placed on a seat of a vehicle such as an automobile and secured to the vehicle seat by a seat belt with which the vehicle seat is provided.

BACKGROUND ART

In a vehicle such as an automobile, restraining protective seats for infants have been used in order to retain the sitting posture of an infant during travel and protect the infant from shock at the time of acceleration and deceleration. An infant restraining and protective seat of this kind is placed on a seat of the vehicle and is secured by a seat belt with which the vehicle seat is provided.

Among these infant restraining and protective seats, one of a reclining type has been developed in order to place an infant in a sleeping posture which will induce restful sleep when the infant is to sleep or in order to place the infant in a comfortable posture when the infant is relaxing.

FIG. 10 illustrates an example of such a common infant restraining protective seat capable of reclining. As is evident from FIG. 10, a restraining protective seat 1 for infants comprises a seat main unit 2 for seating an infant and a base 3 for supporting the infant in a reclinable manner. The mutually opposing surfaces of the seat main unit 2 and base 3 are curved surfaces that are arcuate in shape. The seat main unit 2 is adapted so as to be reclinable relative to the base 3 along these curved surfaces. A locking mechanism, not shown, which prevents relative movement between the seat main unit 2 and base 3 is controlled by an operating lever 4 to be placed in a locked state or an unlocked state, whereby the seat main unit 2 can be reclined to assume several reclining angles.

The main seat unit 2 is provided with an infant seat belt 5 comprising belts 5a for restraining the infant and a protective pad 5b. In this case, the seat main unit 2 is provided, at several locations in the vertical direction, with holes 2a through which the infant seat belt 5 is passed. This makes it possible to adjust the height of the infant seat belt 5 over several stages in conformity with the size of the infant.

As shown in the same Figure, the infant restraining protective seat 1 thus constructed has its base 3 placed upon a vehicle seat 6, and a seat belt 7 with which the vehicle seat 6 is provided it tightened upon being passed through a mounting hole 8 or a mounting hole 9 formed in the seat main unit 2, thereby fixing the restraining protective seat 1 to the vehicle seat 6.

However, in such an arrangement in which the seat belt 7 is passed through the mounting hole 8 of the seat main unit 2 and then tightened, the seat belt 7 and a seat belt setting portion 2b of the seat main unit 2 are firmly engaged. Consequently, when it is attempted to recline the seat main unit 2 from the presently set reclining angle to another angle, reclining cannot be achieved with the seat belt 7 in the tightened state. Accordingly, the seat belt 7 must first be released from the tightened state and then re-tightened after the seat main body 2 has been turned to the desired reclining angle. Thus, labor is involved in changing the reclining angle of the seat main unit 2. In particular, an infant presently awake often falls asleep and the reclining operation is particularly troublesome when it is attempted to change the reclining angle while the infant is still asleep.

One method of solving this problem is to tighten the base 3 by the seat belt 7, rather than tightening the seat main unit 2 by the seat belt 7 directly. With such an arrangement, however, the infant restraining protective seat 1 is subjected to a large inertial force when the vehicle undergoes deceleration in excess of a predetermined value. As a result, the seat main unit 2 slides with respect to the base 3 and a change is produced in the reclining attitude of the infant restraining protective seat 1. In order to prevent such a change in reclining attitude at the time of great deceleration, a strength maintaining mechanism is required between the seat main unit 2 and the base 3. However, not only must this strength maintaining mechanism be large in size in order to resist such a large force, but the mechanism is inevitably complicated in structure so as not to detract from the reclining function. Accordingly, the infant restraining protective seat 1 is heavy and troublesome to handle.

The present invention has been devised in view of these problems and its object is to provide a restraining protective seat for infants in which the reclining angle can be changed in simple fashion while the seat belt is maintained in a tightened state.

Another object of the present invention is to provide a restraining protective seat for infants in which the reclining attitude can be held with assurance, even at the time of great deceleration, without requiring a complicated force maintaining mechanism, the seat being light in weight and easy to handle.

DISCLOSURE OF THE INVENTION

In order to attain the foregoing objects, a restraining protective seat for infants according to the present invention is characterized in that a protecting member, which does not allow a seat belt to come into direct contact with the seat main unit when the seat belt is tightened, is interposed between the seat belt and the seat main unit. Further, the seat is characterized by being equipped with an engaging mechanism which causes the protecting member and the seat main unit to engage when the vehicle undergoes deceleration in excess of a predetermined value.

In the restraining protective seat for infants according to the present invention having such a construction, the seat belt does not directly engage the seat main unit when the restraining protective seat is secured to the vehicle seat by pulling the seat belt tightly upon passing it through mounting holes in the seat main unit. Accordingly, the reclining angle of the seat main unit can be adjusted with the seat belt left in the tightened state. The reclining operation of the restraining protective seat for infants is thus simplified.

When a large inertial force acts upon the restraining protective seat for infants owing to a large amount of vehicle deceleration, the protecting member and the seat main unit are caused to engage, thereby preventing sliding of the seat main unit. This makes it possible to reliably prevent a change in the reclining attitude of the restraining protective seat at the time of great deceleration without requiring a complicated strength maintaining mechanism. Since such a complicated strength maintaining mechanism is not required, it is possible to reduce the weight of the restraining protective seat. As

BEST MODE FOR CARRYING OUT THE INVENTION

Embodiments of the present invention will now be described with reference to the drawings.

Figure 1B:
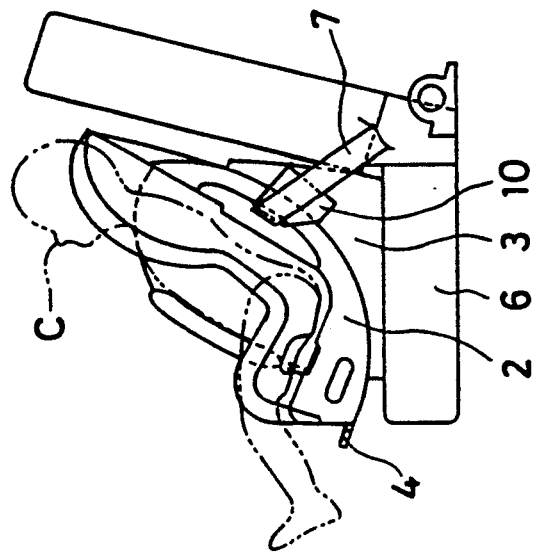
FIG. 1 illustrates an embodiment of a restraining protective seat for infants according to the present invention, in which (a) is a side view showing an infant in a seated posture, (b) a side view showing the infant in a comfortable posture and (c) a side view showing the infant in a sleeping posture.
Figure 1A:
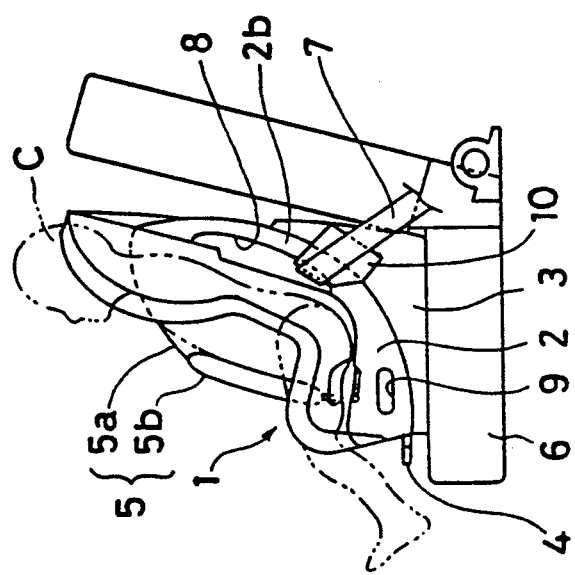
Figure 1C:
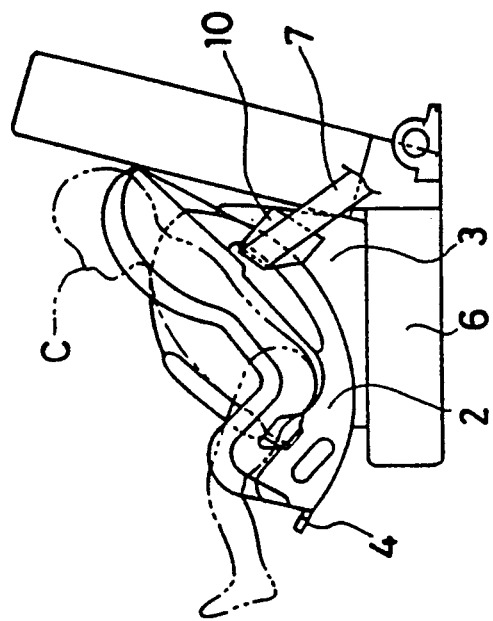

As shown in FIG. 1, a restraining protective seat 1 for infants is placed upon the seat 6 of a vehicle such as an automobile, and the seat belt 7 with which the seat 6 is provided is passed through the mounting hole 8 of the seat main unit 2 and then tightened, thereby retaining and securing the protective seat, just as in the prior art. In this case, however, in accordance with this embodiment, a protector 10 serving as the protecting member of the present invention is interposed between the seat belt 7 and the seat belt setting portion 2b of the seat main unit 2.

Figure 2:
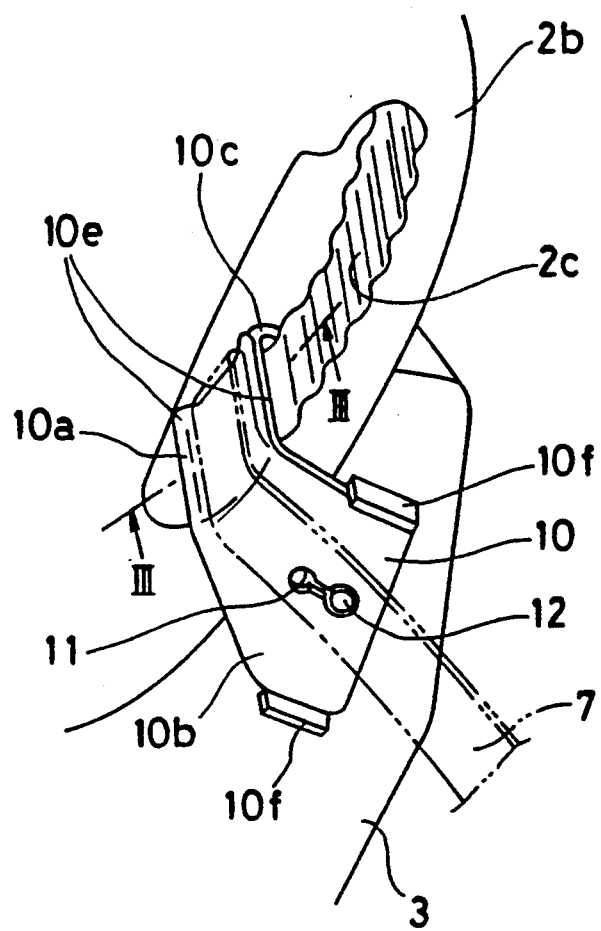
FIG. 2 is a partially enlarged perspective view showing the vicinity of a seat belt setting portion in the restraining protective seat for infants.

As illustrated in FIG. 2, the protector 10 is formed to have a substantially C-shaped cross section and includes a central portion 10a and a pair of left and right side portions 10b, 10c extending substantially at right angles from left and right ends of the central portion 10a. Each of the pair of side portions 10b, 10c is formed to have a mounting hole 11. As is evident from FIG. 3(a), the mounting hole 11 includes a pair of small circular holes 11a, 11b and a linear hole 11c connecting these small circular holes 11a, 11b. The base 3 is provided on its left and right side portions with a pair of upstanding pins 12 (the pin on the right side is not shown). The protector 10 is passed through the mounting hole 8 of the seat main unit 2 so as to embrace the seat belt setting portion 2b. Of the pair of mounting holes 11a, 11b of the side portions 10b, 10c, the holes 11a nearest the edges are mated with the pins 12, thereby attaching the protector 10 to the base 3. In this case, the diameter of each pin 12 is set to be slightly larger than the width of the linear hole 11c, and hence the arrangement is such that the pin 12 is incapable of passing through the linear hole 11c when acted upon by an ordinary force. However, the arrangement is such that if a force greater than a predetermined value acts upon the pin 12, then the pin 12 will cause the portion forming the linear hole 11c of the protector 10 to undergo plastic deformation, as depicted in (b) of FIG. 3, as a result of which the pin is capable of moving to the other hole 11b by passing through the linear hole 11c.

Further, as shown in (a) of FIG. 3, the seat belt setting portion 2b of the seat main unit 2 and the central portion 10a of the protector are formed to have identically shaped corrugated surfaces 2c, 2d, respectively, on their mutually opposing surfaces. The corrugated surfaces 2c, 10d are so arranged as to having a prescribed gap $a$ between them under ordinary conditions in which the pin 12 is penetrating the hole 11a on the edge side of the protector 10. The arrangement is such that when the pin 12 is moved to the other hole 11b upon being subjected to a force greater than a predetermined value, the two corrugated surfaces 2c, 10d mesh with each other, as illustrated in (b) of FIG. 3. When the two corrugated surfaces 2c, 10d are in the meshed state, the seat main unit 2 is prevented from moving relative to the base 3 in the reclining direction, and therefore a change in the reclining attitude is prevented. In other words, an engaging mechanism according to the invention is constructed by the corrugated surfaces 2c, 10d, the mounting hole 11 and the pin 12.

Figure 3A:
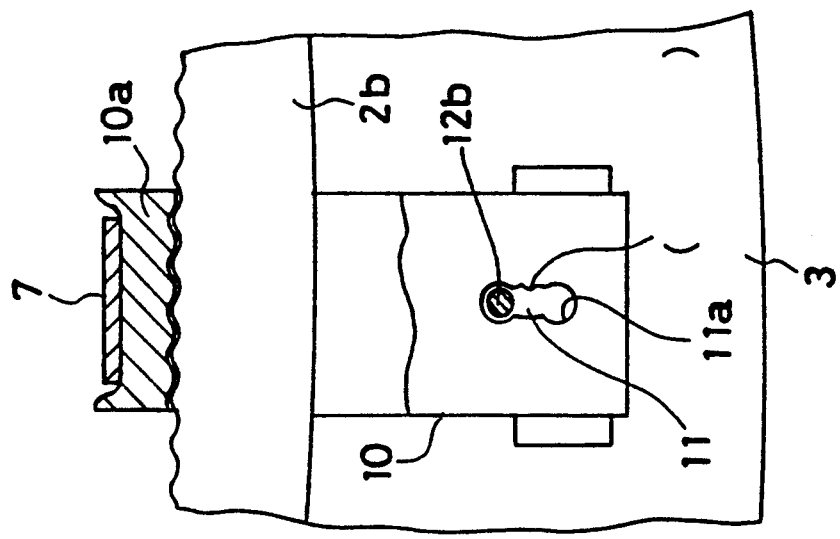
FIG. 3 is a sectional view taken along line III—III of FIG. 2, in which (a) is a sectional view showing the state which prevails under ordinary conditions and (b) is a sectional view showing the state which prevails under great deceleration.

Furthermore, as is evident from FIG. 2 and FIG. 3(a), both ends of the central portion of protector 10 are formed to have a pair of guides 10e, 10e by which the seat belt 7 is prevented from slipping off the central portion 10 of the protector. In addition, the side portions 10b, 10c of protector 10 are also provided with a pair of guides 10f, 10f, respectively. These similarly prevent the seat belt 7 from slipping off the protector 10.

Next, a case will be described in which the infant restraining protective seat 1 of the embodiment is mounted on the seat 6 of a vehicle such as an automobile.

First, in a case where the infant restraining protective seat 1 is to be mounted on the vehicle seat 6 facing forwardly, the protective seat 1 is placed upon the vehicle seat 6 and the seat belt 7 provided on the seat 6 is passed through the mounting hole 8, just as in the prior art, and the seat belt 7 is then tightened in such a manner that it comes to be situated between the pair of guides 10e, 10e of the central portion 10a of the protector. As a result, the infant restraining protecting seat 1 is firmly secured to the vehicle seat 6. In this case, the seat belt 7 engages the protector 10, as shown in FIG. 2, but it in no way engages the seat main unit 2. Accordingly, the tightening force of the seat belt 7 is transmitted to the base via the protector 10 and pin 12.

The operation of this embodiment will now be described.

If an infant C is to be seated in a sitting attitude once the infant restraining protective seat 1 has been mounted to the vehicle seat 1, the operating lever 4 is pulled to unlock the reclining locking mechanism. Then, after the seat main unit 2 has been set to the reclining angle for the sitting attitude shown in FIG. 1(a), the operating lever 4 is returned to lock the seat main unit 2 at this reclining angle. Next, the infant C is seated in the infant restraining protective seat 1 and the infant C is retained by the infant seat belt 5 of the protective seat 1. Thus, the infant C is restrained in the protective seat 1 in the sitting attitude.

When the infant C becomes tired and it is desired to place the infant in a more comfortable attitude, the operating lever 4 is pulled to unlock the reclining locking mechanism and the seat main unit 2 is set at the reclining angle for the comfortable attitude shown in (b) of the Figure while the infant C remains seated. In this case, the seat belt 7 of the vehicle does not engage the seat main unit 2, and therefore the seat main unit 2 can readily be reclined while the seat belt 7 is left in the tightened state. Thereafter, the operating lever 4 is returned to lock the seat main unit 2 at this reclining angle. Thus, the infant C assumes a more comfortable attitude and can relax.

When the infant C falls asleep and it is desired to place the infant in an attitude for sleeping, the operating lever 4 is similarly pulled to unlock the reclining locking mechanism and the seat main unit 2 is set at the reclining angle for the sleeping attitude shown in (c) of the Figure while the infant C remains asleep. In this case also, the seat belt 7 of the vehicle does not engage the seat main unit 2, and therefore the seat main unit 2 can readily be reclined while the seat belt 7 is left in the tightened state. Thereafter, the operating lever 4 is returned to lock the seat main unit 2 at this reclining angle. Thus, the infant C assumes an attitude for sleeping and is capable of sleeping comfortably.

When the vehicle undergoes ordinary deceleration during ordinary traveling of the vehicle, the infant restraining protective seat 1 attempts to move forwardly owing to this inertial force. However, since the inertial force is not that great, the seat main unit 2 is held at the set reclining angle by the locking mechanism and the reclining attitude does not change. In this case, the pin 12 does not plastically deform the linear hole 11c of the protector 10 and does not move to the other hole 11b. Thus, the pin is held in the state shown in FIG. 3(a).

Figure 3B:
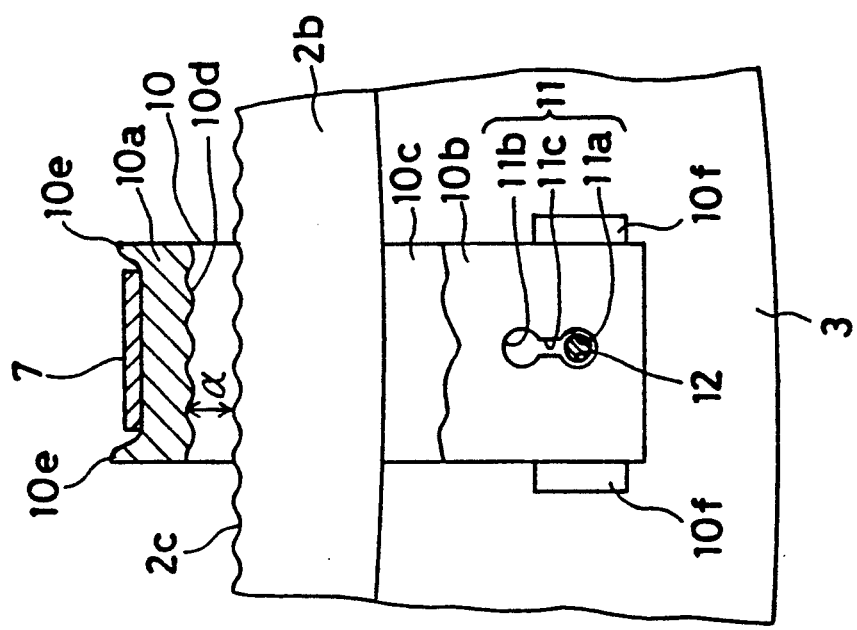

When the vehicle undergoes deceleration in excess of a predetermined value, the inertial force which attempts to move the infant restraining protective seat 1 in the forward direction increases. Consequently, the pin 12 plastically deforms the portion of protector 10 having the linear hole 11c and moves to the other hole 11b. Owing to this movement of pin 12 to the other hole 11b, the corrugated surface 10d of the central portion 10a of the protector and the corrugated surface 2c of the seat belt setting portion 2b in the seat main unit 2 mesh with each other so that the state shown in FIG. 3(b) is established. Even though the seat main unit 2 attempts to slide relative to the base 3 in the reclining direction owing to the application of a large force, in this state the sliding of the seat main unit 2 is impeded by the meshing of the two corrugated surfaces 2c, 10d. As a result, the reclining attitude of the seat main unit 2 is prevented from changing and damage to the lock mechanism in the reclined state is prevented.

A change in the reclined attitude of the seat main unit 2 is prevented in this fashion at all reclining positions of the seat main unit 2.

Figure 4:
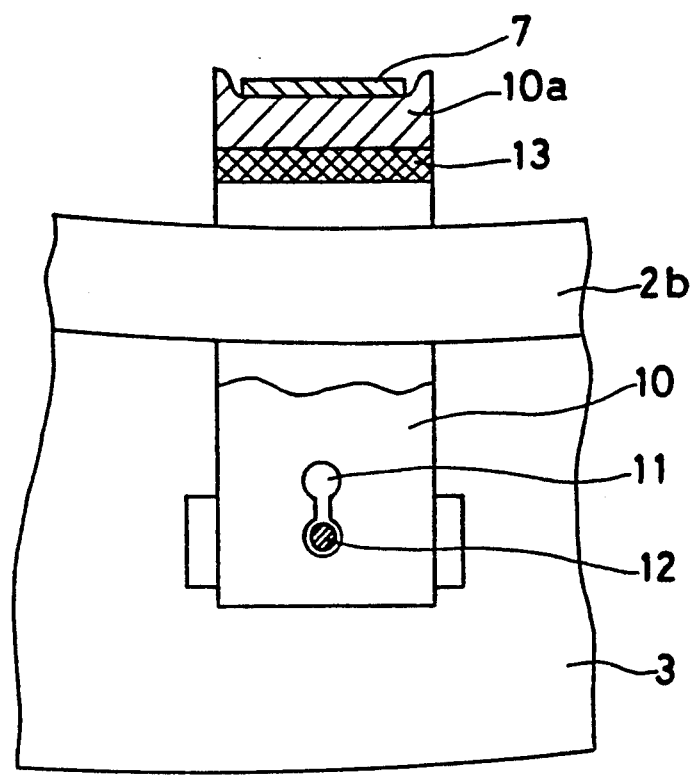
FIG. 4 is a sectional view, similar to that of FIG. 3(a), showing another embodiment of the present invention.

FIG. 4 is a diagram, similar to that of FIG. 3, illustrating another embodiment of the present invention. Components identical with those of the foregoing embodiment are designated by like reference characters and a description thereof is deleted.

In this embodiment, as illustrated in FIG. 4, a slip stopping member 13 comprising a high-friction material such as rubber is fixedly provided on the surface of protector 10 that opposes the seat belt setting portion 2b. The method of mounting the infant restraining protective seat 1 of this embodiment on the vehicle seat 6 and the operation of the protective seat are approximately the same as in the above-described embodiment. Therefore, the only points that will be described are those that differ from the earlier embodiment, all else being deleted.

When deceleration greater than a predetermined value acts upon the vehicle and the pin 12 moves to the other hole 11b upon plastically deforming the portion of protector 10 having the linear hole 11c, the seat belt setting portion 2b comes into pressured contact with and engages the slip stopping member 13. As a result, slipping of the seat main unit 2 is impeded by a frictional force, and therefore the reclined attitude of the seat main unit 2 is prevented from changing.

In this embodiment also, a change in the reclined attitude of the seat main unit 2 is prevented in this fashion at all reclining positions of the seat main unit 2.

It should be noted that if the surface of the seat belt setting unit 2b that opposes the slip stopping member 13 is made a surface with a structure that increases the frictional force, such as a roughened surface having a suitable degree of roughness, then slipping of the seat main unit 2 can be prevented to an even greater extent. In addition, the slip stopping member 13 can also be provided on the side of the seat belt setting member 2b. If such is the case, however, the slip stopping member 13 must be provided over the entire length of the seat belt setting portion 2b, and a greater amount of material will be required. For this reason, it is preferred that the slip stopping member 13 be provided on the side of the protector 10, as illustrated.

Furthermore, a material having a large coefficient of friction can be used for the protector 10 itself, and the slip stopping member 13 can be worked to apply some frictional force to the protector 10.

In both of the two embodiments described above, the protector 10 undergoes plastic deformation when the amount of deceleration is great. In other words, the fact that the protector 10 has undergone plastic deformation indicates that a large force has acted upon the infant restraining protective seat. More specifically, the plastic deformation of the protector 10 performs the function of an indicator which indicates the limit of use of the infant restraining protective seat, namely that reuse of the seat is prohibited.

Figure 5:
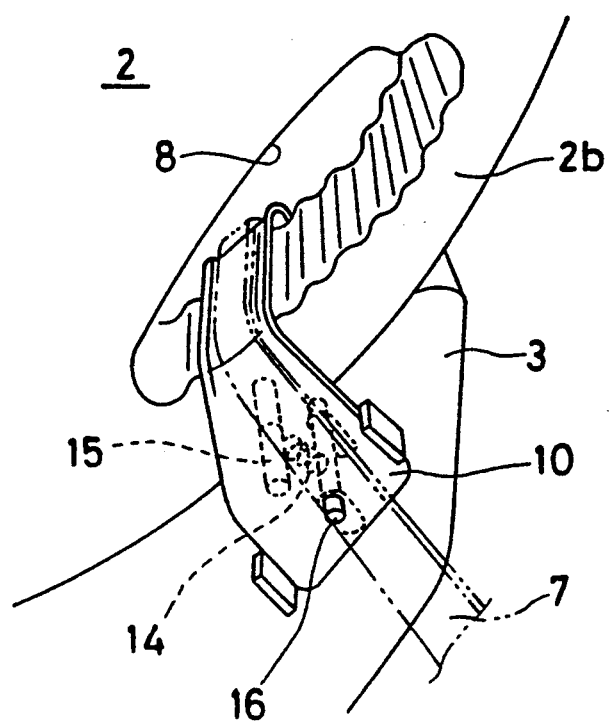
FIG. 5 is a partially enlarged perspective view, similar to that of FIG. 2, showing a further embodiment of the present invention.

FIG. 5 is a diagram, similar to that of FIG. 2, illustrating yet another embodiment of the present invention. Components identical with those of the foregoing embodiment shown in FIG. 2 are designated by like reference characters and a description thereof is deleted.

Figure 8A:
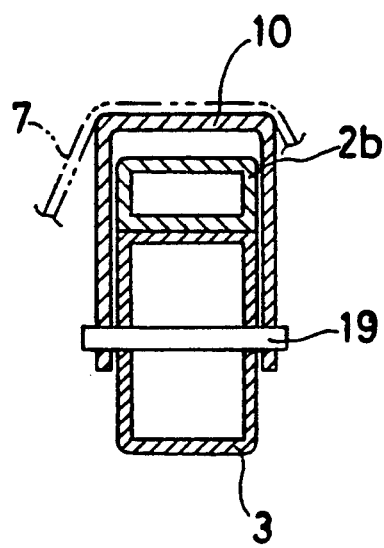
FIG. 8 shows the vicinity of the seat belt setting portion in this embodiment, in which (a) is a sectional view corresponding to FIG. 6(b), and (b) is a sectional view corresponding to FIG. 6(d)
Figure 8B:
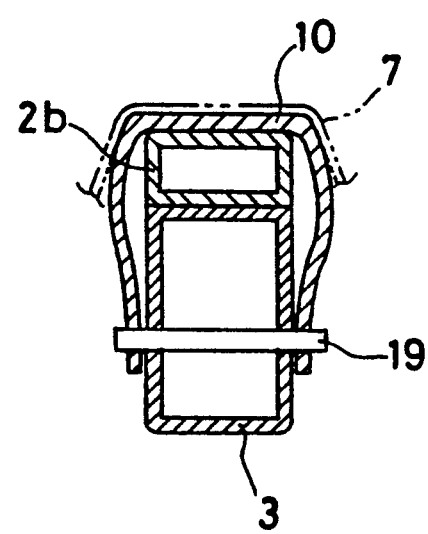

In this embodiment, as illustrated in FIG. 5, pins 15, 16 are secured to the base 3 and protector 10, respectively. As shown in detail in FIGS. 8(b), (d), the pin 16 is disposed in a state passing through oblong holes 17, 18 provided in the base 3. Accordingly, the base 3 and protector 10 are capable of moving relative to each other over a distance decided by the lengths of the oblong holes 17, 18 and the diameter of the pin 16.

Figure 6A:
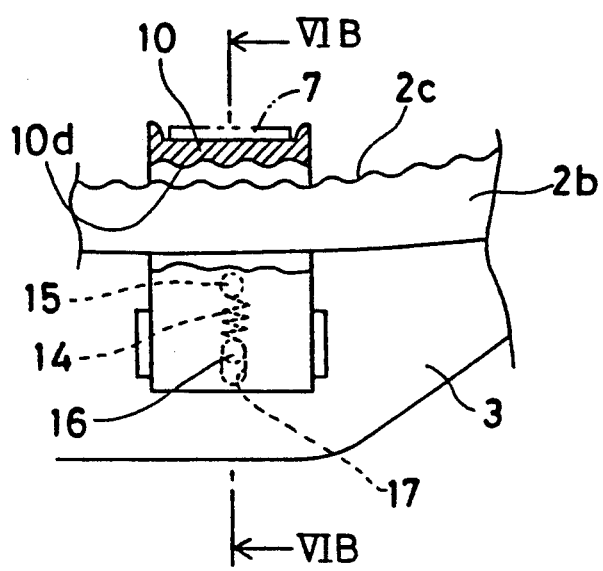
FIG. 6 shows the vicinity of the seat belt setting portion in this embodiment, in which (a) is a side view under ordinary conditions, (b) is a sectional view taken along line VIB—VIB of (a), (c) is a side view under great deceleration, and (d) is a sectional view taken along line VID—VID of (c)
Figure 6B:
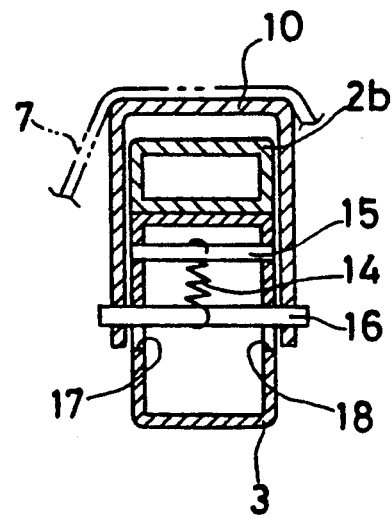
Figure 6C:
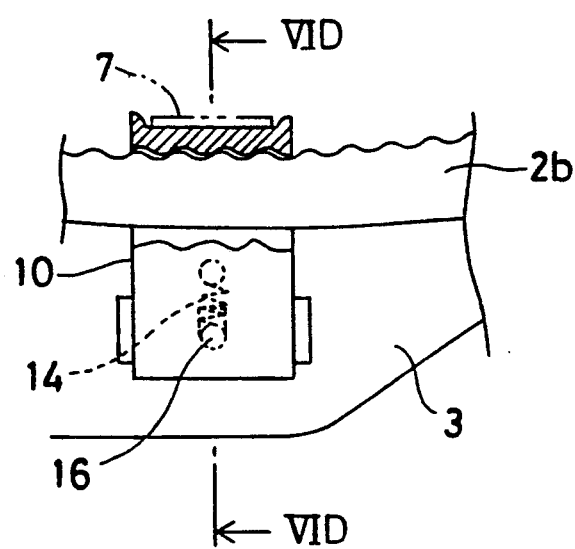
Figure 6D:
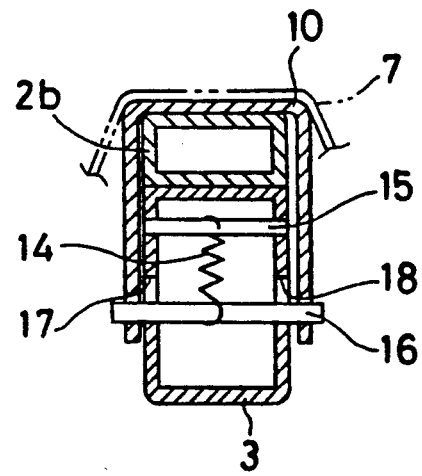

A tension spring 14 is stretched between the pin 15 and the pin 16, and the two pins 15, 16 are biased toward each other at all times by the spring 14. The spring 14 is so adapted that it will not be flexed by a force large enough to tighten the infant restraining protective seat 1 by means of the seat belt 7. However, when an inertial force acts upon the infant restraining protective seat 1 owing to a somewhat large deceleration (e.g., a deceleration produced by emergency braking), the spring 14 flexes and the protector 10 and base 3 move relative to each other so that the corrugated surface 10d on the central portion 10a of the protector and the corrugated surface 2c on the seat belt setting portion 2b of the seat main unit 2 mesh with each other, thereby establishing the state shown in FIG. 6(c). Accordingly, slipping of the seat main unit 2 is impeded by the meshing engagement between the two corrugated surfaces 2c, 10d. As a result, the reclining attitude of the seat main unit 2 is prevented from changing.

Figure 7:
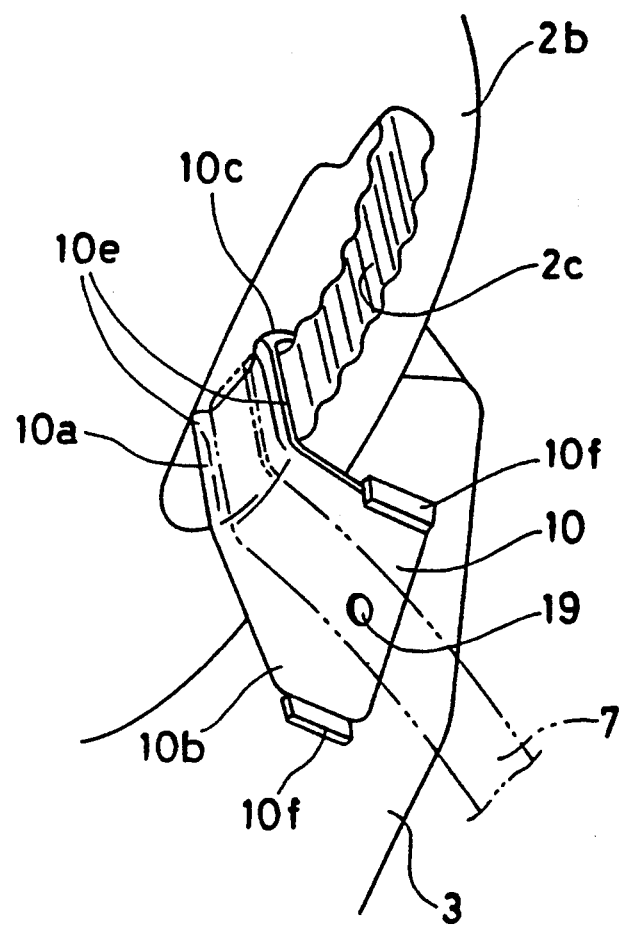
FIG. 7 is a partially enlarged perspective view, similar to that of FIG. 2, showing yet another embodiment of the present invention.

FIG. 7 is a diagram, similar to that of FIG. 2, illustrating a further embodiment of the present invention. Components identical with those of the foregoing embodiment shown in FIG. 2 are designated by like reference characters and a description thereof is deleted.

In this embodiment, as illustrated in FIG. 7, the protector 10 is formed from an elastically deformable material such as resin. The protector 10 is fixed to the base 3 by a pin 19, as illustrated in detail in FIGS. 8(a), (b). Accordingly, the protector 10 and base 3 are almost incapable of moving relative to each other. The protector 10 is so adapted that it will not be elastically deformed by a force large enough to tighten the infant restraining protective seat 1 by means of the seat belt 7, as shown in (a) of FIG. 8. However, when an inertial force acts upon the infant restraining protective seat 1 owing to a somewhat large deceleration equivalent to that at emergency braking, both sides 10a, 10b of the protector 10 elastically deform, as shown in (b) of the Figure, so that the corrugated surface 10d on the central portion 10a of the protector and the corrugated surface 2c on the seat belt setting portion 2b of the seat main unit 2 mesh with each other. Accordingly, slipping of the seat main unit 2 is impeded by the meshing engagement between the two corrugated surfaces 2c, 10d. As a result, the reclining attitude of the seat main unit 2 is prevented from changing.

Figure 9A:
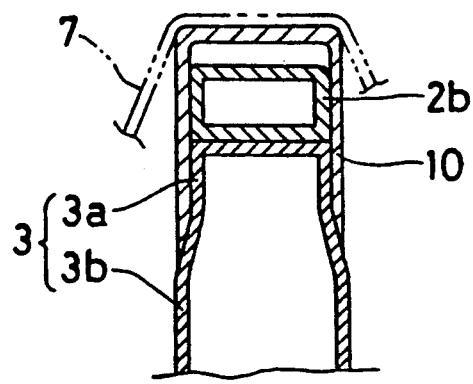
FIG. 9 illustrates still another embodiment of the present invention, in which (a) is a sectional view corresponding to FIG. 6(b), and (b) is a sectional view corresponding to FIG. 6(d)
Figure 9B:
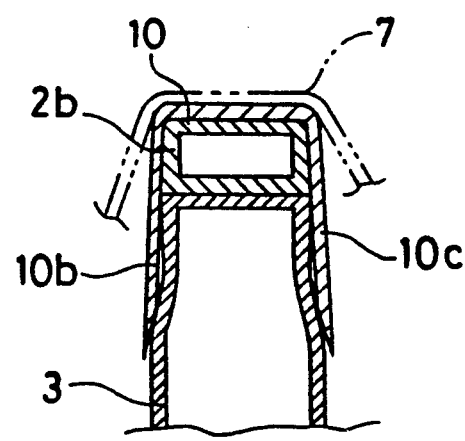
Figure 10:
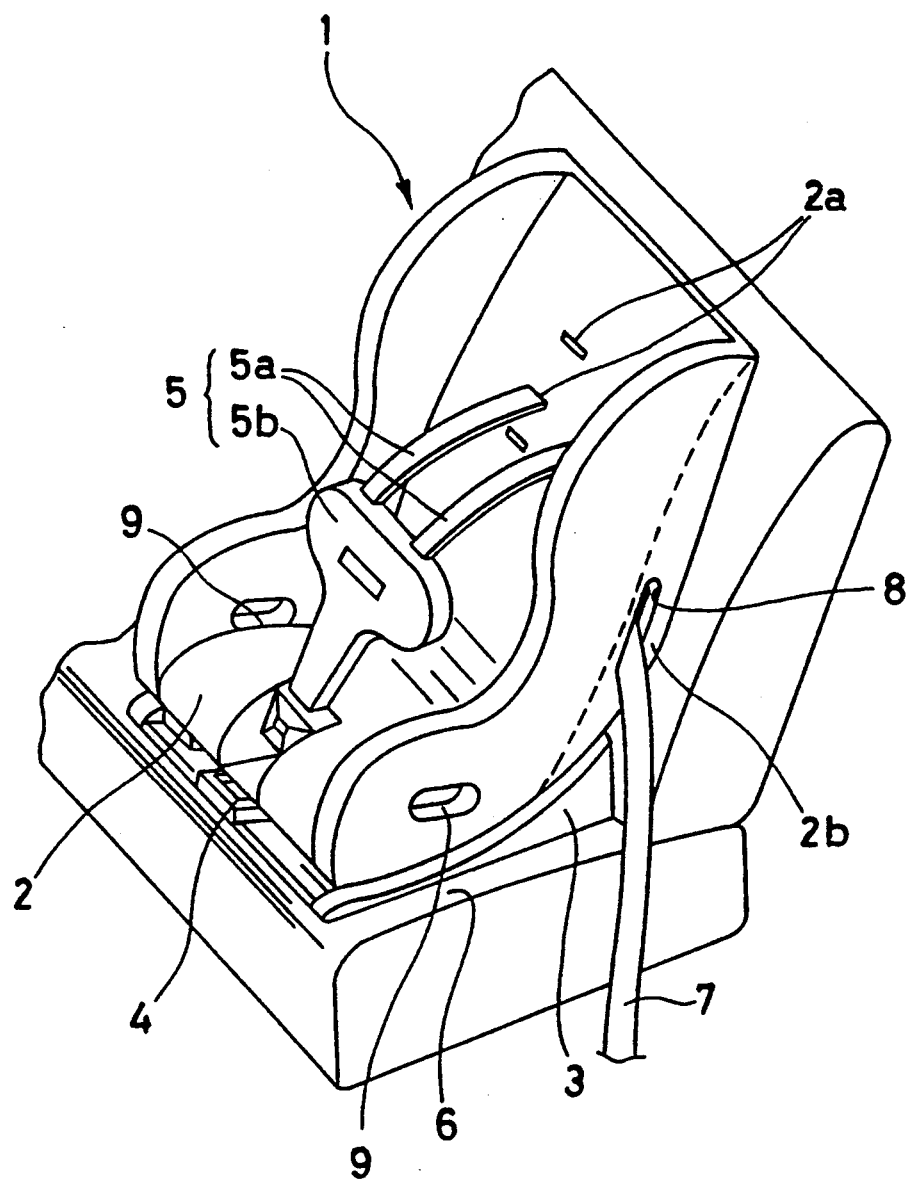
FIG. 10 is a perspective view showing an example in which an ordinary constraining protective seat for infants is attached to a vehicle seat.

FIG. 9 is a diagram illustrating a further embodiment of the present invention. Components identical with those of the foregoing embodiment shown in FIG. 2 are designated by like reference characters and a description thereof is deleted.

As illustrated in FIGS. 9(a), (b), the transverse sectional shape of the base 3 has a small-width portion 3a adjacent the seat belt setting portion 2b, a large-width portion 3b having a width greater than that of the small-width portion 3a, and a tapered portion 3c formed between the small-width portion 3a and the large-width portion 3b. The protector 10 is formed from an elastically deformable material such as resin. As is evident from (a) of the Figure, the protector 10 is fitted onto the seat belt setting portion 2b and the small-width portion 3a of base 3. The distal end of the protector 10 has a tapered surface along the tapered surface of the tapered portion 3c. The protector 10 is so adapted that it will not be elastically deformed by a force large enough to tighten the infant restraining protective seat 1 by means of the seat belt 7. However, when an inertial force acts upon the infant restraining protective seat 1 owing to a somewhat large deceleration equivalent to that at emergency braking, the base 3 moves toward the central portion 10a of the protector which causing the two side portions 10b, 10c of the protector 10 to elastically deform outwardly along the tapered surface of the tapered portion 3c. Owing to this movement, the corrugated surface 10d on the central portion 10a of the protector and the corrugated surface 2c on the seat belt setting portion 2b of the seat main unit 2 mesh with each other. Accordingly, slipping of the seat main unit 2 is impeded by the meshing engagement between the two corrugated surfaces 2c, 10d. As a result, the reclining attitude of the seat main unit 2 is prevented from changing.

As in each of the embodiments shown in FIGS. 5 through 8, a change in the reclined attitude of the seat main unit 2 is similarly prevented at all reclining positions of the seat main unit 2.

In each of the embodiments shown in FIGS. 5 through 9, the slip stopping member 13 can similarly be provided, as shown in FIG. 4, instead of forming the corrugated surfaces 2c, 10d, and the slip stopping member 13 can be worked to apply some frictional force to the protector 10. In addition, a material having a large coefficient of friction can be used for the protector 10 itself.

Industrial Applicability

The restraining protective seat for infants according to the present invention is applicable to a field in which such a protective seat is placed upon the seat of a vehicle such as an automobile and is fixed to the vehicle seat by a seat belt furnished on the vehicle seat, thereby restraining and protecting the infant.

What is claimed is:

1. A restraining protective seat for infants for use with a seat belt in an automobile, comprising:
    a seat main unit;
    a guide base slidably connected to said seat main unit such that a reclining position of said seat main unit can be varied relative to said guide base;
    locking means for locking said seat main unit to said guide base at a selected reclining position;
    a mounting arm fixedly connected to a rear surface of said seat main unit and formed so as to define a hole between the rear surface of said seat main unit and a front surface of said mounting arm through which the seat belt in the automobile is fed; and
    a protective member operatively mounted to said guide base so that said seat main unit can be reclined without direct contact to the front surface of said mounting arm, said guide base being fixedly maintainable on a seat of the automobile by tightening the seat belt.

2. A restraining protective seat according to claim 1, wherein said protective member is formed in a substantially C-shape in cross-section and including a central portion, a left side portion and a right side portion, the central portion being formed so as to operatively contact and guide the seat belt in contact therewith, the left and right side portions being operatively mounted to said guide base, and at least one of the front surface of said mounting arm and an inner surface of the central portion of said protection member has a slip stopping surface formed thereon so as to form a fixedly secure surface contact between the front surface and the inner surface when said guide base, said seat main unit and thereby said mounting arm inertially move relative to said protective member.

3. A restraining protective seat according to claim 2, wherein the front surface of said mounting arm and the inner surface of the central portion of said protective member each has a corrugated surface formed thereon so as to form a fixedly secure surface contact with each other when said guide base, said seat main unit and thereby said mounting arm inertially move relative to said protective member.

4. A restraining protective seat according to claim 2, wherein the left and right side portions of said protective member have each defined thereon a mounting hole positioned substantially along a longitudinal axis of the left or right side portions, each mounting hole being shaped substantially as an upper circular hole and a lower circular hole connected by a linear channel, and said mounting arm having a pin protruding out from left and right side portions thereof and positioned so as to alignably connect with the lower circular holes on the left and right side portions of said protective member, the mounting holes being formed so as to plastically deform as the pin shifts position from the lower holes to the upper holes when said guide base, said seat main unit and said mounting arm inertially move relative to said protective member.

5. A restraining protective seat according to claim 2, wherein said guide base has defined a mounting hole on each of a left and right outer surface, the mounting hole being substantially oblong-shaped in cross-section where a major axis of each mounting hole is positioned substantially along a longitudinal axis of the left or right side portions of said protective member, said guide base having a first pin positioned in an interior thereof and through each mounting hole, both ends of the first pin being fixedly secured to said protective member such that said protective member and said guide base are connectively movable relative to each other, said guide base further having a second pin fixedly mounted in the interior of said guide base and positioned substantially parallel to the first pin, and a tension spring fixedly connected between the first and second pins so as to bias the pins toward each other.

6. A restraining protective seat according to claim 2, wherein said guide base includes a mounting pin fixedly positioned through said guide base so as to protrude from left and right outer surfaces of said guide base, the mounting pin further being fixedly connected at both ends to the left and right side portions of said protective member so as to mount said protective member to said guide base, and said protective member is formed from an elastically resilient material such that said protective member elastically deforms when said guide base, said seat main unit and said mounting arm inertially move relative to said protective member.

7. A restraining protective seat according to claim 2, wherein said guide base is formed to have a tapering width from a bottom portion to a top portion thereof in transverse cross-section, and the left and right side portions of said protective member are each formed to have tapering surfaces toward a lower edge thereof, said protective member and said guide base being positioned so as to form slidable contact between the tapering width of said guide base and the tapering surfaces of the left and right side portions, and said protective member being formed from an elastically resilient material such that the left and right side portions elastically deform when said guide base, said seat main unit and said mounting arm inertially move relative to said protective member.

8. A restraining protective seat according to claim 2, wherein the central portion of said protective member is further formed with guide flanges positioned on first and second edges of the central portion so as to be located on both sides of a length of the seat belt.

* * * * *